US 8,341,702 B2

(12) United States Patent
Graziani et al.

(10) Patent No.: US 8,341,702 B2
(45) Date of Patent: Dec. 25, 2012

(54) METHODS FOR AUTHENTICATING AND AUTHORIZING A MOBILE DEVICE USING TUNNELED EXTENSIBLE AUTHENTICATION PROTOCOL

(75) Inventors: Giulio Graziani, Ottawa (CA); Yong Li, Ottawa (CA)

(73) Assignee: Bridgewater Systems Corp., Ottawa (CA)

( * ) Notice: Subject to any disclaimer, the term of this patent is extended or adjusted under 35 U.S.C. 154(b) by 850 days.

(21) Appl. No.: 11/979,353

(22) Filed: Nov. 1, 2007

(65) Prior Publication Data

US 2009/0119742 A1 May 7, 2009

(51) Int. Cl.
*H04L 29/06* (2006.01)
(52) U.S. Cl. ................ 726/3; 726/12; 726/21
(58) Field of Classification Search .............. 726/1–5, 726/11–14, 26–30, 21; 713/150–152, 168, 713/170, 182–184; 380/247, 248, 255, 270
See application file for complete search history.

(56) References Cited

U.S. PATENT DOCUMENTS

| | | | |
|---|---|---|---|
| 6,374,298 B2 * | 4/2002 | Tanno | 709/227 |
| 7,082,535 B1 | 7/2006 | Norman et al. | |
| 7,146,645 B1 * | 12/2006 | Hellsten et al. | 726/33 |
| 7,450,554 B2 * | 11/2008 | Zhang | 370/338 |
| 7,707,412 B2 * | 4/2010 | Nyberg et al. | 713/168 |
| 2002/0099671 A1 * | 7/2002 | Mastin Crosbie et al. | 705/500 |
| 2003/0226017 A1 | 12/2003 | Palekar et al. | |
| 2004/0030765 A1 | 2/2004 | Zilbershtein et al. | |
| 2004/0098588 A1 * | 5/2004 | Ohba et al. | 713/169 |
| 2004/0107360 A1 | 6/2004 | Herrmann et al. | |
| 2005/0044365 A1 * | 2/2005 | Haukka et al. | 713/171 |
| 2005/0102529 A1 | 5/2005 | Buddhikot et al. | |
| 2005/0198173 A1 * | 9/2005 | Evans | 709/206 |
| 2005/0273850 A1 | 12/2005 | Freund | |
| 2006/0005254 A1 | 1/2006 | Ross | |
| 2006/0026671 A1 | 2/2006 | Potter et al. | |
| 2006/0185013 A1 | 8/2006 | Oyama et al. | |
| 2006/0236383 A1 | 10/2006 | Cam-Winset et al. | |
| 2006/0256763 A1 * | 11/2006 | Nguyen et al. | 370/338 |
| 2007/0101132 A1 * | 5/2007 | Cuellar et al. | 713/168 |
| 2007/0230453 A1 | 10/2007 | Giaretta et al. | |
| 2008/0040606 A1 * | 2/2008 | Narayanan et al. | 713/169 |
| 2008/0282325 A1 * | 11/2008 | Oyama et al. | 726/4 |
| 2008/0307488 A1 * | 12/2008 | Hammond et al. | 726/1 |
| 2009/0037732 A1 * | 2/2009 | Boccon-Gibod et al. | 713/168 |

OTHER PUBLICATIONS

Aboba, B. et al., "Extensible Authentication Protocol (EAP)," Network Working Group, RFC 3748, Jun. 2004, pp. 1-67.
Palekar, A. et al., "Protected EAP Protocol (PEAP)," PPPEXT Working Group, Internet-Draft, Mar. 22, 2003, pp. 1-51.
Eronen, P. et al., "Diameter Extensible Authentication Protocol (EAP) Application," Network Working Group, RFC 4072, Aug. 2005, pp. 1-33.
Rigney, C. et al., "Remote Authentication Dial in User Service (RADIUS)," Network Working Group, RFC 2865, Jun. 2000, pp. 1-76.

(Continued)

*Primary Examiner* — Gilberto Barron, Jr.
*Assistant Examiner* — Abdulhakim Nobahar
(74) *Attorney, Agent, or Firm* — Zilka-Kotab, PC

(57) ABSTRACT

Methods for authenticating and authorizing a mobile device using tunneled extensible authentication protocol are provided. The methods include evaluating an inner user identifier against a policy engine to determine a home AAA server to route an access request for inner user authentication. Instead of having a static route configured based on an outer identifier/roaming identity, the policy engine can have multiple rules and actions for routing the request. The evaluation can be based on the conditions of the inner user identifier and or other AAA attributes received in the request. The request is transmitted within a secure communication tunnel. There are several embodiments of evaluating an inner user identifier against a policy engine.

19 Claims, 4 Drawing Sheets

OTHER PUBLICATIONS

Funk, P. et al., EAP Tunneled TLS Authentication Protocol Version 0 (EAP-TTLSv0), EAP, Internet-Draft, Apr. 2007, pp. 1-38.

Lin et al., "Evolution of Wireless Lan Authentication," *Information Development Authority of Singapore*, 8 Temasek Boulevard Suntec Tower 3, #14-00, Singapore 038988, pp. 1-10, 2004.

Puthenkulam, "Compound Authentication Binding Problem (EAP Binding Draft)," *The Internet Society*, Mar. 17, 2003, IFET #56, San Francisco, pp. 1-18.

"Public WLAN Interworking Study—Validation Report," *IDA*, Revision 1.0, Sep. 27, 2004.

* cited by examiner

METHODS FOR AUTHENTICATING AND AUTHORIZING A MOBILE DEVICE USING TUNNELED EXTENSIBLE AUTHENTICATION PROTOCOL

BACKGROUND OF THE INVENTION

1. Field of the Invention

The present invention relates to mobile communications, and more particularly, to authenticating and authorizing a mobile device using tunneled EAP.

2. Background of Invention

An increasingly large number of individuals use portable computing devices, such as laptop computers, personal data assistants (PDAs), smart phones and the like, to support mobile communications. The number of computing devices, and the number of networks that these devices connect to, has increased dramatically in recent years.

In a typical wireless Internet environment, Wi-Fi based hotspots could be adjacent or distributed in cellular telephone networks. When the services of wireless LAN and cellular networks are integrated, the mobile device (e.g., laptop computer) can move across networks. There are two types of roaming: roaming between the same type of network (e.g., wireless LAN to wireless LAN or cellular network to cellular network) is defined as horizontal roaming; roaming between different types of networks, such as a wireless LAN and a cellular network, is defined as vertical roaming.

The service provider allowing access to its network usually requires a mobile node and/or a mobile user to authenticate that it is entitled to access the network before it is granted network access. Authentication is the process of identifying a device or user. For example, when logging on to a computer network, user authentication is commonly achieved using a username and password. Authentication is distinct from authorization, which is the process of giving devices or individuals access to services and features based on their identity. Authentication merely ensures that an individual is who he or she claims to be, but does not address the access rights of the individual.

Accordingly, a wireless network generally includes many wireless nodes and users trying to gain access to a network. The primary means for controlling access include network access servers ("NAS") and authentication servers, such as authentication, authorization, accounting (AAA) servers. A NAS, which is also referred to as an access point, provides access to the network. The devices and users connect through an access point via some form of wireless connection (e.g. IEEE 802.1X) to obtain access to a network (e.g., the Internet). In typical installations, there is a local authentication server, which allows the user to authenticate the network and a user's home authentication server that authenticates the user. The authentication servers are typically RADIUS (Remote Authentication Dial-In User Service) or Diameter servers.

In this type of network access server environment, a version of the Extensible Authentication Protocol (EAP) is typically used for network authentication. For further information regarding EAP, see e.g., "RFC 3748: Extensible Authentication Protocol," by the Internet Engineering Task Force (IETF), the disclosure of which is hereby incorporated by reference. EAP is a general protocol for authentication, which supports multiple authentication mechanisms. The client devices and the authentication server (e.g., RADIUS or DIAMTER server) exchange EAP messages by embedding them as attributes of a RADIUS packet. For further information regarding RADIUS, see, e.g., "RFC 2865: Remote Authentication Dial In User Service (RADIUS)," by the IETF, the disclosure of which is hereby incorporated by reference. See also, "RFC 4072: Diameter Extensible Authentication Protocol (EAP) Application, by the IETF, the disclosure of which is hereby incorporated by reference.

Certain TLS (Transport Layer Security) based Extended Authentication Protocols optionally allow user authentication to occur within the protected tunnel. EAP-TTLS (Extended Authentication Protocol Tunneled Transport Layer Security) and PEAP (Protected Extended Authentication Protocol) are EAP protocols that are authentication tunneling protocols that create a protected channel for user authentication. These protocols use a two-phase authentication approach. In the first phase, the mobile device authenticates the foreign network, that is, the mobile device uses a digital certificate to ensure that the foreign network is legitimate. After the foreign network is authenticated, an encrypted channel between the mobile device and the mobile device's home AAA (i.e. AAA/H) is established using TLS and the information provided in the digital certificate. In the second phase, user information (e.g. Inner-User-ID) is securely transmitted using the established TLS-encrypted channel. The foreign network can authenticate the user from the user information using an inner user authentication method (e.g. PAP(Password Authentication Protocol), CHAP(Challenge-handshake authentication protocol), EAP, MSCHAPv1 (Microsoft Challenge handshake authentication protocol) and MSCHAPv2). The authentication can be carried out either by a TLS-AAA (the TLS end point of the foreign network) or by a remote AAA/H. For PEAP, this inner user authentication method typically must be another EAP authentication method. For further information about EAP-TTLS, see, Internet Draft EAP Tunneled TLS Authentication Protocol Version 0 (draft-funk-eap-ttls-v0), which is hereby incorporated by reference. For further information about PEAP, see Internet Draft PEAP (draft-josefsson-pppext-eap-tls-eap-06.txt), which is hereby incorporated by reference.

In the two-phase authentication protocols, such as those described above, the foreign network must know how to route user information to the user's home server. In prior art systems, routing is typically achieved using static routes configured based on generic information transmitted between the mobile the device and foreign network during the first phase of the authentication process. In prior art systems, the foreign network routes the inner user authentication information using the outer identity/roaming identity used by the mobile device to authenticate the foreign network, in some cases even before inner user information is known. For example, the foreign network may have a list associating outer identities to home servers (e.g. outer identity user@IPprovider is routed to home server IPprovider). This front end approach can be problematic because it may be desirable to route a user's inner user authentication information to a AAA server other than the general AAA server.

What is needed are methods for wireless Internet environments that provide increased flexibility for authenticating a user.

SUMMARY OF THE INVENTION

The present invention provides systems and methods for a foreign network to route user authentication information to a particular home server using a tunneled Extensible Authentication Protocol (EAP).

The invention includes evaluating inner user information against a policy engine to determine which AAA server to route the request to for inner user authentication. Instead of having a static route configured based on the outer identity/roaming identity, the EAP policy can have multiple rules and actions to route the request. The evaluation can be based on the conditions on inner user evaluation and or other AAA attributes received in the request. Using this backend policy approach to evaluate the inner user information simplifies upfront EAP based TLS policy evaluation. Further, because inner user information is not known until later in an EAP based TLS protocol exchange, the present invention allows for a highly flexible routing scheme to be employed to determine the appropriate AAA server.

In an embodiment, the TLS-AAA evaluates the embedded user name attribute (used in legacy authentication protocols such as PAP, CHAP, etc.) against a local policy to determine which AAA/H to route the embedded user name to.

In an embodiment, the TLS-AAA evaluates the inner EAP-Identity (for EAP authentication protocols) or inner user identity (for PAP, CHAP, MSCHAPv1/v2 authentication protocols) to determine which AAA/H to route the inner user identifier to by evaluating it against a local policy.

In an embodiment, the policy engine places one or more of the following conditions on the inner user identifier:
 Equals
 StartsWith
 EndsWith
 Contains
 Regular expression, and
 Appears.

In an embodiment, the mobile node includes, but is not limited to laptop computers, cellular phones, smart phones, and personal data assistants.

In an embodiment, the implementation is based on a generic network access via the RADIUS protocol. The network access type can be of various types i.e. WiFi, WiMAX, wireline, etc. It can also be extended for applications requiring AAA authentications.

In an embodiment, a policy engine is placed at any server where authentication is tunneled for a mobile device such that a request can be directed or redirected to a particular AAA server based on a condition.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
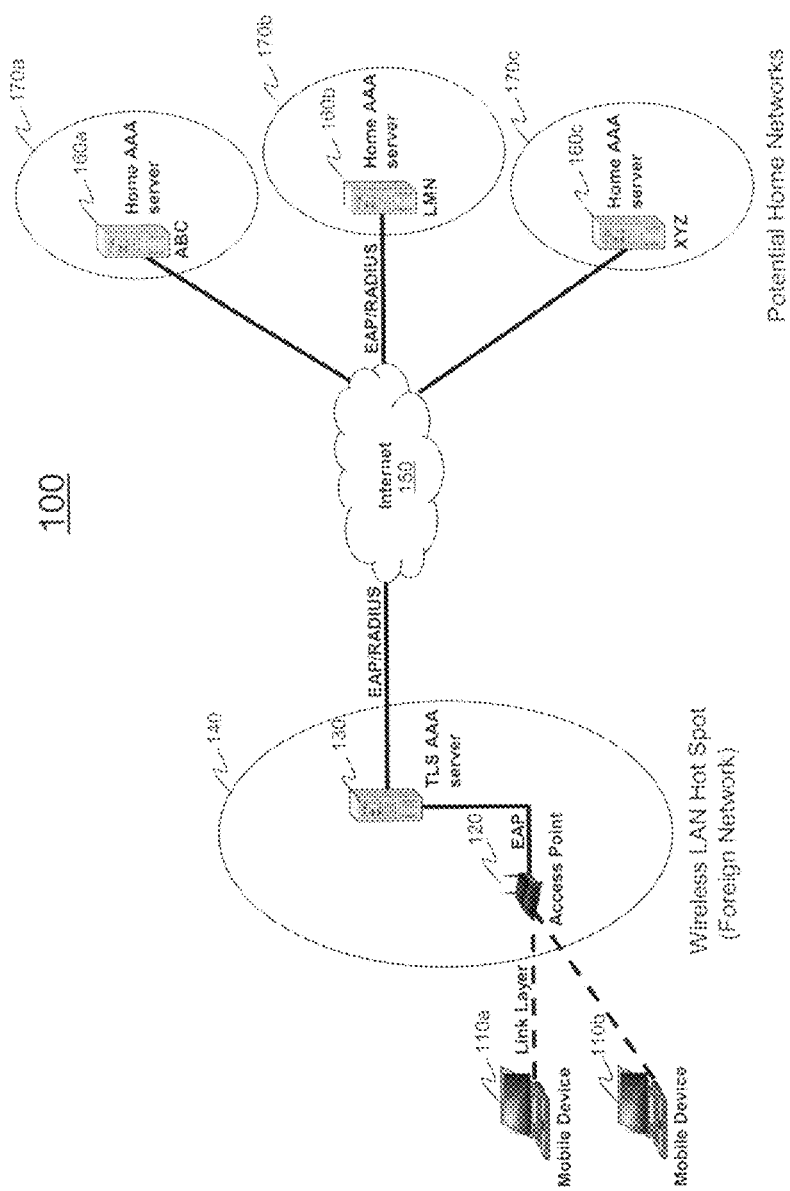
FIG. 1 provides a network diagram of a portion of a roaming environment.

FIG. 1 provides a network diagram of a portion of a roaming environment 100. The diagram provides a simplified network view that can be used to illustrate the authentication procedures needed when a mobile device roams from one network to another. In the example of FIG. 1, mobile devices 110a and 110b seek network access to wireless LAN hot spot 140. Access point 120 and visited Authentication, Authorization, Accounting (AAA) server 130 within wireless LAN hot spot 140 support access and authentication of mobile users. Visited AAA server 130 is coupled to home AAA servers 160a, 160b, and 160c via network 150. Home AAA servers 160a, 160b, and 160c are located within respective home network 170a, 170b, and 170c. Home AAA servers are associated with particular mobile devices. Thus, for each mobile device that attempts to access the network 140 there are several potential home AAA servers that the mobile device's request may be potentially routed to. For the purposes of authentication, a mobile device 110 can be wirelessly coupled to access point 120 using EAP.

EAP provides an authentication framework that supports multiple authentication methods. EAP typically runs directly over data link layers, such as point-to-point protocol ("PPP") or IEEE 802.1X, without requiring internet protocol ("IP"). EAP may be used on dedicated lines, as well as switched circuits, and wired as well as wireless links. Deployments of IEEE 802.11 wireless LANs are based on EAP and use several EAP methods, including EAP-TLS (Transport Level Security), EAP-TTLS (Tunneled Transport Level Security), PEAP (Protected Extensible Authentication Protocol), and EAP-SIM (Subscriber Identify Module). These methods support authentication credentials that include digital certificates, user-names and passwords, secure tokens, and SIM secrets. The present invention can be implemented with each of these methods, but is not limited to these methods. Furthermore, the embodiments discussed herein focus on wireless links, however, the scope and spirit of the present invention extends to wired links, as well.

Using EAP nomenclature, a mobile device 110 is considered an EAP peer, while access point 120 is considered an EAP authenticator and a TLS AAA server 130 and a home AAA server 160 is considered an EAP authentication server.

One of the advantages of the EAP architecture is its flexibility. EAP is used to select a specific authentication mechanism, typically after the authenticator requests more information in order to determine the specific authentication method to be used. Rather than requiring the authenticator to be updated to support each new authentication method, EAP permits the use of a backend authentication server, which may implement some or all authentication methods, with the authenticator acting as a pass-through for some or all methods and peers.

Referring to FIG. 1, when a mobile device 110 attaches to access point 120, it needs to authenticate with its home AAA server 160 before network access is granted. The authentication is based on EAP and mobile device 110, visited TLS AAA server 130 and home AAA server 160 take on EAP roles, as identified above. EAP messages are transported between the mobile device 110 acting as an EAP Peer to the access point 120, the EAP Authenticator, using any of many transport methods, such as 802.1x, PANA, and the like. The transport between access point 120 and a home AAA server 160 is typically carried over AAA protocol using RADIUS or Diameter. The EAP messages travel through a visited AAA server 130, zero or more broker AAA server(s) (not shown) and finally arrive at the home AAA server 160. It should be noted that broker AAA servers may also be present between access point 120 and TLS AAA server 130 and simply operate in a pass through mode.

Figure 2:
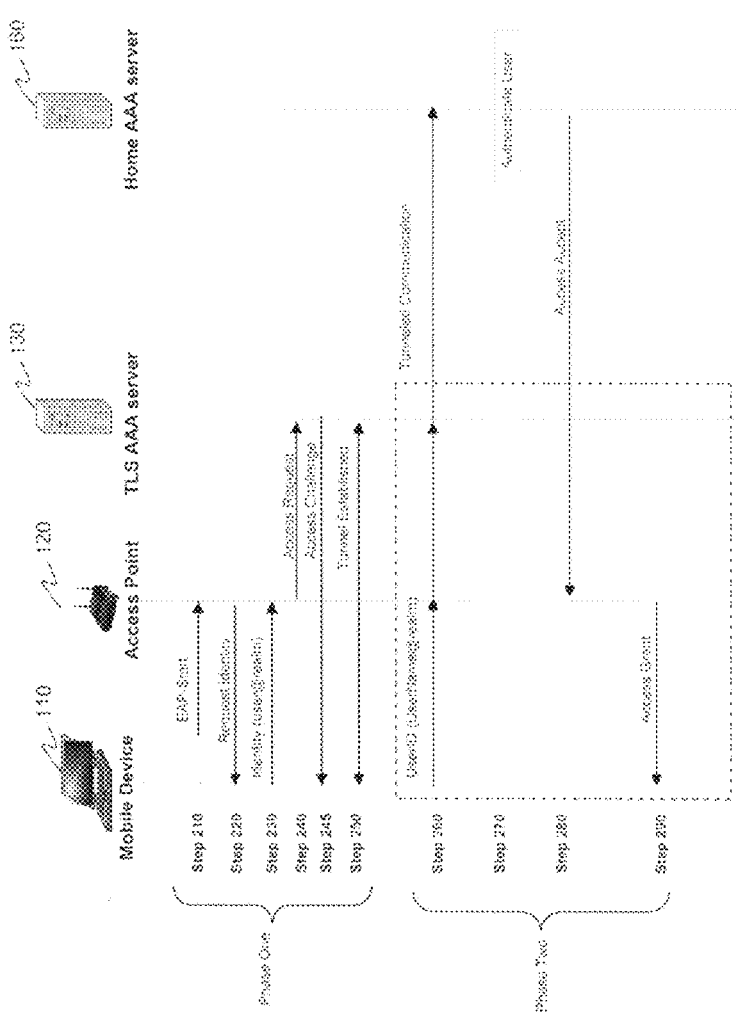
FIG. 2 provides a prior art method for authenticating and authorizing a mobile device using tunneled EAP.

FIG. 2 illustrates a prior art method for authenticating and authorizing a mobile device 110 using tunneled EAP. Method 200 begins in step 210.

In step 210, access point 120 receives an EAP-Start message. This message comes from the network 140 and signals that the EAP procedure should start.

In step 220 access point 120, which is located in the visited network 140, issues an EAP-Request-Identity message. If access point 120 knows the visited network Authentication Policy, it will encode the policy as part of the EAP-Request-Identity message. The coding of the message will be similar to the encoding used in "RFC 4284: Identity Selection Hints for the Extensible Authentication Protocol (EAP)," by the IETF, the disclosure of which is hereby incorporated by reference and will be known to individuals skilled in the relevant arts based on the teachings herein and reference to RFC 4284.

In step 230, the mobile device 110 receives the EAP-Request-Identity. Mobile device 110 decodes the message to learn the authentication policy of the visited network 140. Mobile device 110 uses that knowledge and the preconfigured knowledge of the authentication policy of its home network 170 to select the authentication policy required. Mobile device 110 encodes the authentication policy in an EAP-Response-Identity message and sends the message to access point 120. As shown in FIG. 2, the EAP-Response-Identity message can include an outer/realm identity ("user@realm"). This identity is not specific to the user and is not transmitted within a secure tunnel.

In step 240, TLS AAA server 130 decodes the EAP-Response Identity message.

In step 245, TLS AAA server 130 responds to the message with an access challenge message. Access challenge includes information that allows network 140 to be authenticated by mobile device 110, i.e. a digital certificate that lets mobile device know that network 140 is legitimate.

In step 250, a tunnel is established so that user specific information (e.g. User-Name and password) can be securely transmitted between the TLS AAA server 130 and mobile device 110. The tunnel is established between mobile device 110, access point 120, and TLS AAA server 130. The inner User-Name/inner EAP-Identity and password information is secure within this tunnel.

In step 260, TLS AAA server 130 receives a message containing the user specific information. The information in the message is particular to the authentication method that will be used to authenticate the user (e.g. PAP, CHAP, EAP, MSCHAPv1, MSCHAPv2). The authentication method to be used is established in the steps before step 260. The TLS AAA 130 may decide to forward the request to Home AAA server 160 to complete phase 2 of the authentication. It should be noted that TLS AAA 130 and Home AAA 160 may be the same process/application.

At step 270, Home AAA server 160, may act as the EAP Authentication Server, for example, then starts to execute an EAP method appropriate to the authentication method selected. The EAP method continues to execute until it succeeds or fails. In the case of PAP, CHAP, MSCHAPv1, and MSCHAPv2, Home AAA server 160 will authenticate the user based on the received protocol attribute information and will either accept or reject the session. Steps 280 and 290 illustrate a successful authentication occurring that enables mobile device 110 to access network 140. Specifically, in step 290 mobile device 110 receives an EAP-Success message. If successful authentication does not occur, ultimately the process will time out.

Figure 3:
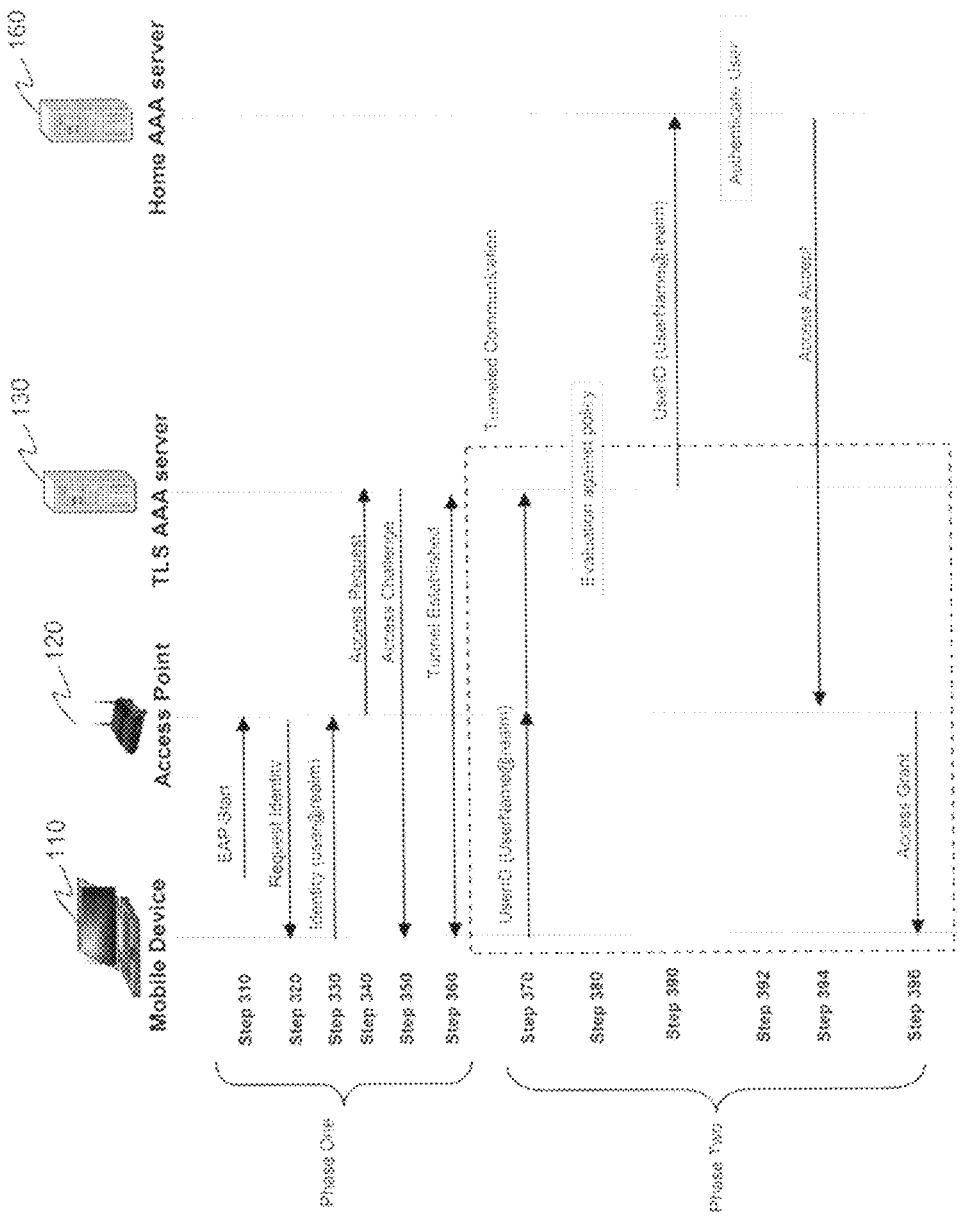
FIG. 3 provides a method for a TLS AAA server to evaluate a mobile device's access request in a communication network using EAP, according to an embodiment of the invention.

FIG. 3 provides a method 300 for a TLS AAA server to evaluate a mobile device's access request in a communication network using EAP, according to an embodiment of the invention. Method 300 begins in step 310.

In step 310, access point 120 receives an EAP-Start message. This message comes from the network 140 and signals that the EAP procedure should start.

In step 320, access point 120, which is located in the visited network 140, issues an EAP-Request-Identity message. If access point 120 knows the visited network Authentication Policy, it will encode the policy as part of the EAP-Request-Identity message.

In step 330, the mobile device 110 receives the EAP-Request-Identity. Mobile device 110 decodes the message to learn the authentication policy of the visited network 140. Mobile device 110 uses that knowledge and the preconfigured knowledge of the authentication policy of its home network 170 to select the authentication policy required. Mobile device 110 encodes the authentication policy in an EAP-Response-Identity message and sends the message to access point 120. As shown in FIG. 3, the EAP-Response-Identity message can include an outer/realm identity ("user@realm"). This identity is not specific to the user and as such may not be secure.

In step 340, TLS server 130 decodes the EAP-Response Identity message.

In step 350, TLS AAA server 130 responds to the message with an access challenge message. Access challenge includes information that allows network 140 to be authenticated by mobile device 110, i.e. a digital certificate that lets mobile device know that network 140 is legitimate.

In step 360, a tunnel is established which allows user specific information (e.g. User-Name and password) to be securely transmitted between TLS server 130 and mobile device 110. The tunnel is established between mobile device 110, access point 120, and TLS AAA server 130. The inner User-Name/inner EAP-Identity and password information is secure within this tunnel.

In step 370, TLS AAA server 130 receives a message containing the user specific information. The information in the message is particular to the authentication method that will be used to authenticate the user (e.g. PAP, CHAP, EAP, MSCHAPv1, MSCHAPv2). The authentication method to be used is established in the steps before step 370.

In step 380, the TLS AAA server 130 will evaluate the embedded user specific information to determine which Home AAA server to route the user specific information to by evaluating it against a local policy. For example, the TLS AAA server 130 will evaluate the embedded User-Name attribute for legacy authentication protocols (PAP, CHAP, etc.) or the EAP-Identity for EAP authentication protocols.

The policy engine can place one or more of the following conditions on an inner user identifier:

Equals
Starts with
Ends with
Contains
Regular expression; and
Appears

An "equals" condition tests if an inner user identifier is the same as a predetermined string. An example of the "equals" condition is as follows: when the "equals" condition is "abc", inner user identifier "abc" satisfies the condition and inner user identifier "abcd" does not.

A "starts with" condition tests if a character string at the beginning of the an inner user identifier is the same as a predetermined string. An example of the "starts with" condition is as follows: when the "starts with" condition is "abc", inner user identifier "abcd" satisfies the condition and inner user identifier "dabc" does not.

An "ends with" condition tests if a character string at the end of an inner user identifier is the same as a predetermined string. An example of the "ends with" condition is as follows: when the "ends with" condition is "abc", inner user identifier "deabc" satisfies the condition and inner user identifier "abcde" does not.

A "contains" condition tests if one or more characters are contained in an inner user identifier. An example of the "contains" condition is as follows: when the "contains" condition is abc, inner user identifier "xyabce" satisfies the condition and inner user identifier "axybec" does not.

A "regular expression" holds a regular expression that is used to match a pattern against an inner user identifier.

An "appears" command tests if an attribute appears in the an Access-Request message.

It should be noted that the commands described above are for exemplary purposes only and that the policy engine can implement any number of different types of tests on information received from mobile device 110 as would be appreciated by one of ordinary skill in the art.

In step 390, after inner user identifier is evaluated against a policy. The user information is forwarded to the appropriate home server as determined by policy evaluation or the TLS AAA policy may determine that the user information is to be processed locally, in otherwords the TLS AAA may also be the home AAA.

Referring to FIG. 1, an example of steps 380 and 390 is as follows: Suppose the UserID for mobile device user of mobile device 110a is johnsmith@realm.com. Suppose AAA/H servers 160a, 160b, and 160c each store user authentication information based the user's last name contained in the User-Name, where server 160a stores user authentication information for users with last names A-J, server 160b stores user authentication information for users with last names K-T, and server 160c stores user authentication information for users with last names U-Z. Policy engine can search the user name johnsmith for an last name using the commands described above and route the user authentication information to server 160b, which would contain the user authentication information for user John Smith.

At step 392, Home AAA server 160, acting as the EAP Authentication Server, for example, then starts to execute an EAP method appropriate to the authentication method selected. The EAP method continues to execute until it succeeds or fails. In the case of PAP, CHAP, MSCHAPv1, and MSCHAPv2, Home AAA server 160 will authenticate the user based on the received protocol attribute information and will either accept or reject the session. Steps 394 and 396 illustrate a successful authentication occurring that enable mobile device 110 to access network 170. Specifically, in step 396 mobile device 110 receives an EAP-Success message. If successful authentication does not occur, ultimately the process will time out.

It should be appreciated that step 380 can be incorporated into prior art method in a variety of ways. For example, a policy engine could be incorporated into a home AAA server that initially receives the inner user identifier based on outer/realm identifier as described in accordance with FIG. 2. After the home AAA server evaluates the inner user identifier it could forward the inner user identifier to another preferred/more appropriate home AAA server based on the evaluation.

Computer System Implementation

Figure 4:
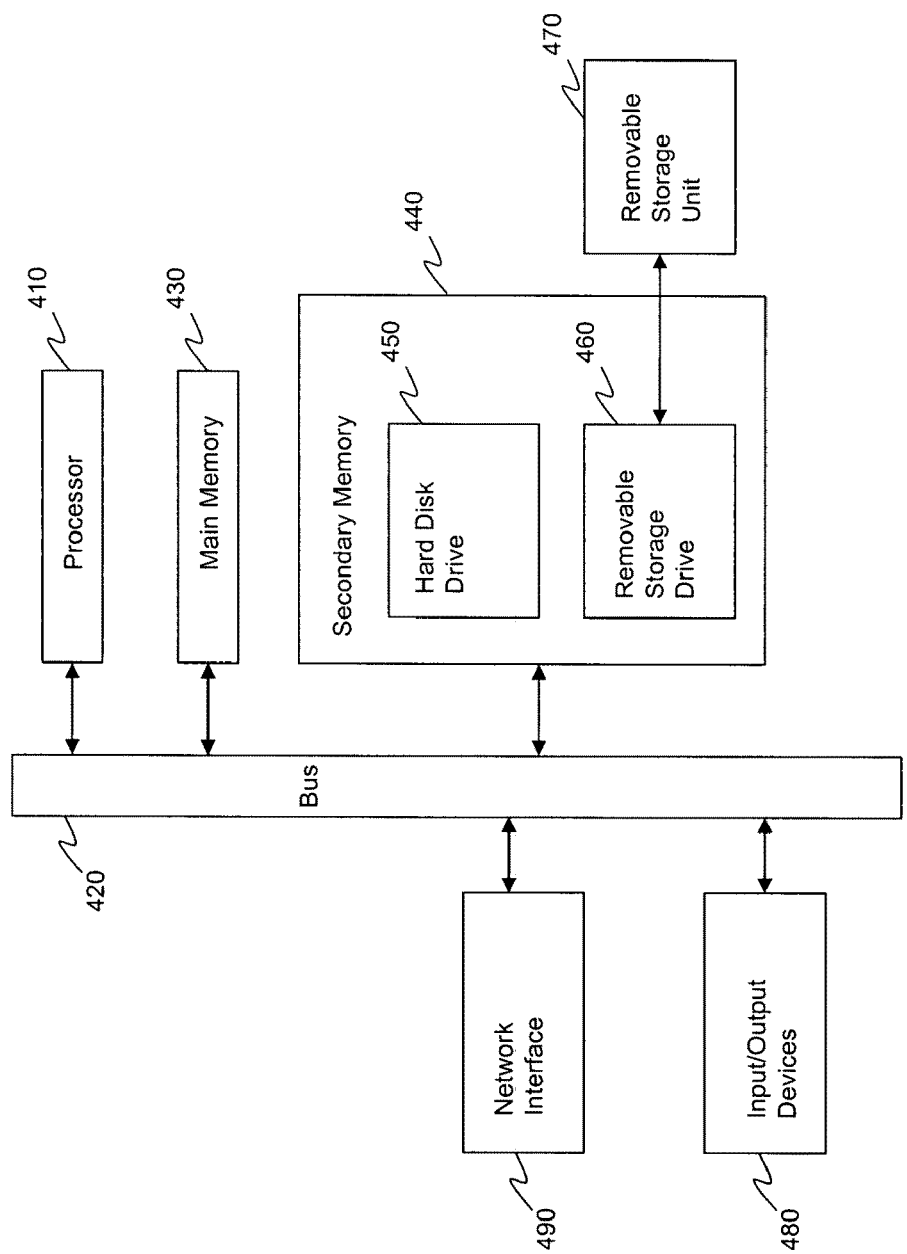
FIG. 4 is a diagram of a computer system on which the methods and systems herein described can be implemented, according to an embodiment of the invention.

In an embodiment of the present invention, the methods and systems of the present invention described herein are implemented using well known computers, such as a computer 400 shown in FIG. 4. The computer 400 can be any commercially available and well known computer capable of performing the functions described herein, such as computers available from International Business Machines, Apple, Sun, HP, Dell, Cray, etc.

Computer 400 includes one or more processors (also called central processing units, or CPUs), such as processor 410. Processor 410 is connected to communication bus 420. Computer 400 also includes a main or primary memory 430, preferably random access memory (RAM). Primary memory 430 has stored therein control logic (computer software), and data.

Computer 400 may also include one or more secondary storage devices 440. Secondary storage devices 440 include, for example, hard disk drive 450 and/or removable storage device or drive 460. Removable storage drive 460 represents a floppy disk drive, a magnetic tape drive, a compact disk drive, an optical storage device, tape backup, ZIP drive, JAZZ drive, etc.

Removable storage drive 460 interacts with removable storage unit 470. As will be appreciated, removable storage unit 460 includes a computer usable or readable storage medium having stored therein computer software (control logic) and/or data. Removable storage drive 460 reads from and/or writes to the removable storage unit 470 in a well known manner.

Removable storage unit 470, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 400, or multiple computer 400s to perform any combination of the functions described herein Computer programs (also called computer control logic) are stored in main memory 430 and/or the secondary storage devices 440. Such computer programs, when executed, direct computer 400 to perform the functions of the present invention as discussed herein. In particular, the computer programs, when executed, enable processor 410 to perform the functions of the present invention. Accordingly, such computer programs represent controllers of the computer 400.

Computer 400 also includes input/output/display devices 480, such as monitors, keyboards, pointing devices, etc.

Computer 400 further includes a communication or network interface 490. Network interface 490 enables computer 400 to communicate with remote devices. For example, network interface 490 allows computer 400 to communicate over communication networks, such as LANs, WANs, the Internet, etc. Network interface 490 may interface with remote sites or networks via wired or wireless connections. Computer 400 receives data and/or computer programs via network interface 490. The electrical/magnetic signals having contained therein data and/or computer programs received or transmitted by the computer 400 via interface 490 also represent computer program product(s).

The invention can work with software, hardware, and operating system implementations other than those described herein. Any software, hardware, and operating system implementations suitable for performing the functions described herein can be used.

Conclusion

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method, comprising:
    establishing a transport layer security (TLS) tunnel between a visited TLS AAA server in a visited network and a client;
    receiving an access request from the client at the visited TLS AAA server within the TLS tunnel;
    evaluating an inner user identifier specific to a user of the client received in the access request at the visited TLS AAA server against a local policy for identifying one of a plurality of home AAA servers storing user authentication information associated with the user; and
    selecting the home AAA server to route the access request to based at least in part on the evaluation of the inner user identifier received in the access request against the local policy, such that the home AAA server storing the user authentication information associated with the user authenticates the user in response to the receipt of the access request;
    wherein the visited TLS AAA server is a first home AAA server evaluating the inner user identifier against the local policy;
    wherein the access request is routed to a second home AAA server based on the evaluation, where the second home AAA server is a preferred server over the first home AAA server for authenticating the user in that the second home AAA server stores the user authentication information associated with the user and the first home AAA server does not store the user authentication information associated with the user.

2. The method of claim 1, wherein the client comprises a cellular telephone, a smart phone, a laptop computer, or a personal data assistant.

3. The method of claim 1, wherein evaluating the inner user identifier against the local policy comprises:
    determining if the inner user identifier equals a known character string.

4. The method of claim 1, wherein establishing a transport layer security (TLS) tunnel between the visited TLS AAA server in the visited network and the client includes establishing the TLS tunnel according to one of Extended Authentication Protocol Tunneled Transport Layer Security (EAP-TTLS) or Protected Extended Authentication Protocol (PEAP).

5. The method of claim 1, wherein the inner user identifier specific to the user includes an EAP-Identity 6. The method of claim 1, wherein the inner user identifier specific to the user includes the User-Name attribute, wherein User-Name attribute is defined by anyone of Password Authentication Protocol (PAP) Challenge-Handshake Authentication Protocol (CHAP). Microsoft Challenge Handshake Authentication Protocol version 1 (MSCHAPv1), or MSCHAPv2 protocols.

7. The method of claim 1, wherein evaluating the inner user identifier against the local policy comprises:
    determining if a prefix portion of the inner user identifier equals a known character string.

8. The method of claim 1, wherein evaluating the inner user identifier against the local policy comprises:
    determining if a suffix portion of the inner user identifier equals a known character string.

9. The method of claim 1, wherein evaluating the inner user identifier against the local policy comprises:
    determining if the inner user identifier contains one or more characters in a defined set of characters.

10. The method of claim 1, wherein in response to routing the access request to the home AAA server, the home AAA server authenticates the user associated with the inner user identifier.

11. A transport layer security (TLS) Authentication, Authorization and Accounting (AAA) server comprising:
    a TLS module coupled to a visited TLS AAA server and configured to establish a TLS tunnel between the visited TLS AAA server in a visited network and a client;
    a receiver of the visited TLS AAA server configured to receive an access request from the client within the TLS tunnel;
    an evaluation module of the visited TLS AAA server configured to evaluate an inner user identifier specific to a user of the client received in the access request against a local policy for identifying one of a plurality of home AAA servers storing user authentication information associated with the user; and
    a routing module of the visited TLS AAA server configured to select the home AAA server to route the access request to based at least in part on the evaluation of the inner user identifier received in the access request against the local policy, such that the home AAA server storing the user authentication information associated with the user authenticates the user in response to the receipt of the access request;
    wherein the visited TLS AAA server is a first home AAA server evaluating the inner user identifier against the local policy;
    wherein the access request is routed to a second home AAA server based on the evaluation, where the second home AAA server is a preferred server over the first home AAA server for authenticating the user in that the second home AAA server stores the user authentication information associated with the user and the first home AAA server does not store the user authentication information associated with the user.

12. The system of claim 11, wherein the inner user evaluation module is further configured to determine if the inner user identifier equals a known character string.

13. The system of claim 11, wherein the inner user evaluation module is further configured to determine if a prefix portion of the inner user identifier equals a known character string.

14. The system of claim 11, wherein the inner user evaluation module is further configured to determine if a suffix portion of the inner user identifier equals a known character string.

15. The system of claim 11, wherein the inner user evaluation module is further configured to determine if the inner user identifier contains characters in a defined set of characters.

16. The method of claim 1, wherein the inner user identifier specific to the user of the client that is received in the access request and compared against the local policy includes a user name including a first name of the user of the client and a last name of the user of the client.

17. The method of claim 16, wherein each of a plurality of home AAA servers store user authentication information associated with a unique subset of users.

18. The method of claim 17, wherein each of the plurality of home AAA servers is associated with a range of letters, where each of the range of letters corresponds to a first letter in the last name of users of the client having authentication information stored within that home AAA server.

19. The method of claim 18, wherein the second home AAA server to which the request is routed is associated with a range of letters including a first letter of the last name of the user of the client.

* * * * *